United States Patent [19]

Stuckmann

[11] 4,044,565

[45] Aug. 30, 1977

[54] APPARATUS FOR AND A METHOD OF LAYING A PIPE LINE

[75] Inventor: Dieter Stuckmann, Selm, Germany

[73] Assignee: Gewerkschaft Eisenhutte Westfalia, Wethmar near Lunen, Germany

[21] Appl. No.: 687,076

[22] Filed: May 17, 1976

[30] Foreign Application Priority Data

May 27, 1975 Germany .............................. 2523340

[51] Int. Cl.² .......................... E21D 5/12; F16L 1/00
[52] U.S. Cl. ...................................... 61/41 A; 61/85; 61/105
[58] Field of Search .................. 61/41 A, 85, 43, 41, 61/63, 72.1, 105

[56] References Cited

U.S. PATENT DOCUMENTS

| | | | |
|---|---|---|---|
| 2,757,515 | 8/1956 | Wilbur et al. | 61/85 |
| 3,831,388 | 8/1974 | Wells | 61/41 A |
| 3,916,629 | 11/1975 | Thompson | 61/41 A |
| 3,967,454 | 7/1976 | Barnes | 61/41 A |

FOREIGN PATENT DOCUMENTS 1,308,763   3/1973   United Kingdom ................ 61/41 A Primary Examiner—Jacob Shapiro
Attorney, Agent, or Firm—Sughrue, Rothwell, Mion, Zinn and Macpeak

[57] ABSTRACT

Apparatus for, and a method of, laying a pipe line utilizes an advanceable drive shield composed of parallel displaceable cutter planks supported by a frame to excavate an open trench. Behind the shield is a receptacle which is closed to the trench and receives individual pipe sections for extending the pipe line through an opening in the receptacle. Some of the cutter planks and the receptacle are provided with gripping devices selectively operable to engage the trench walls to anchor the respective components against shifting forces. The receptacle is connected with the frame for movement therewith or for independent movement. A roller bed which can be raised or lowered or tilted in a universal manner is provided in the receptacle to receive the pipe section lowered into the receptacle. The frame also has an adjustable bulkhead at its front end which can be partly opened to allow material at the working face of the trench to enter the shield for subsequent removal.

19 Claims, 5 Drawing Figures

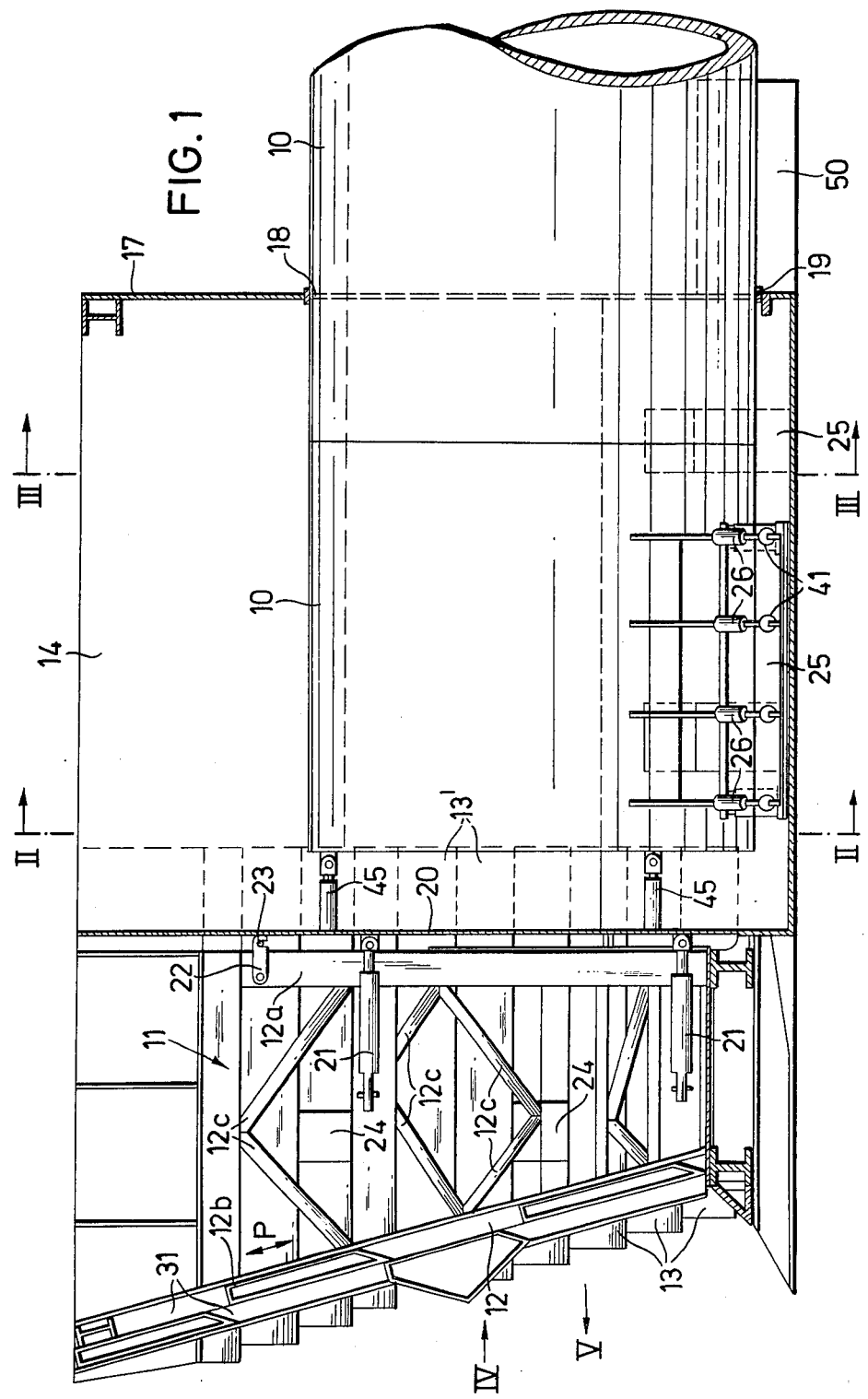

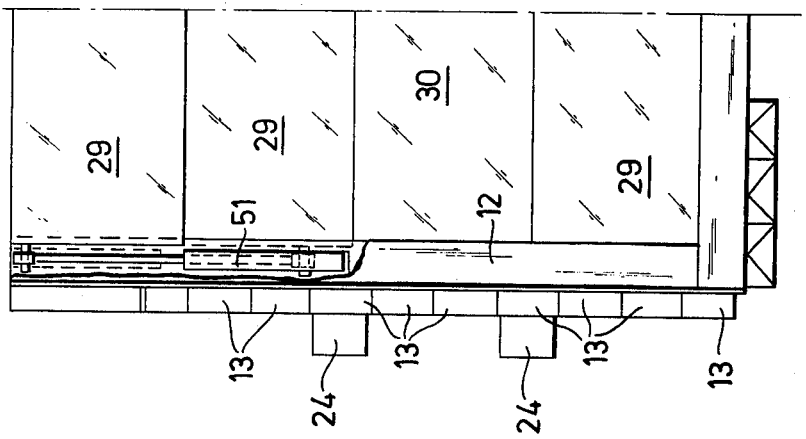
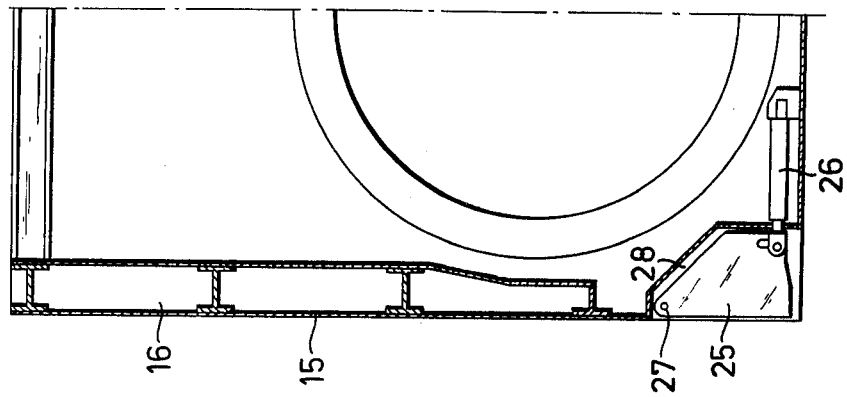
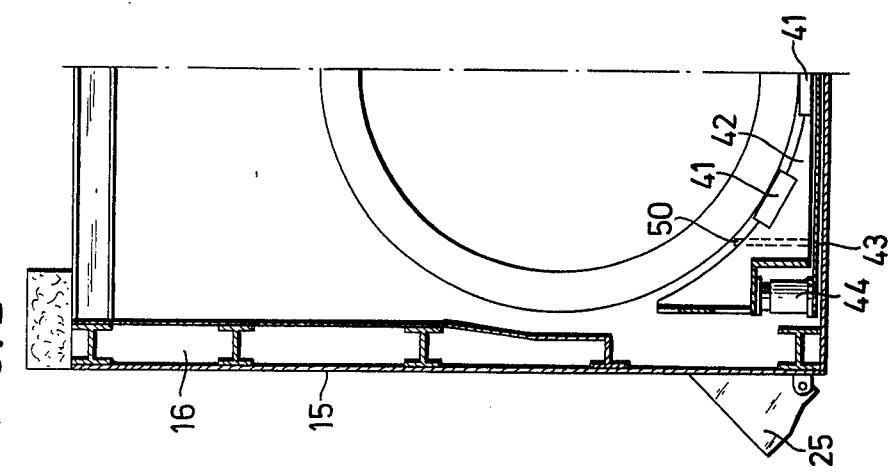

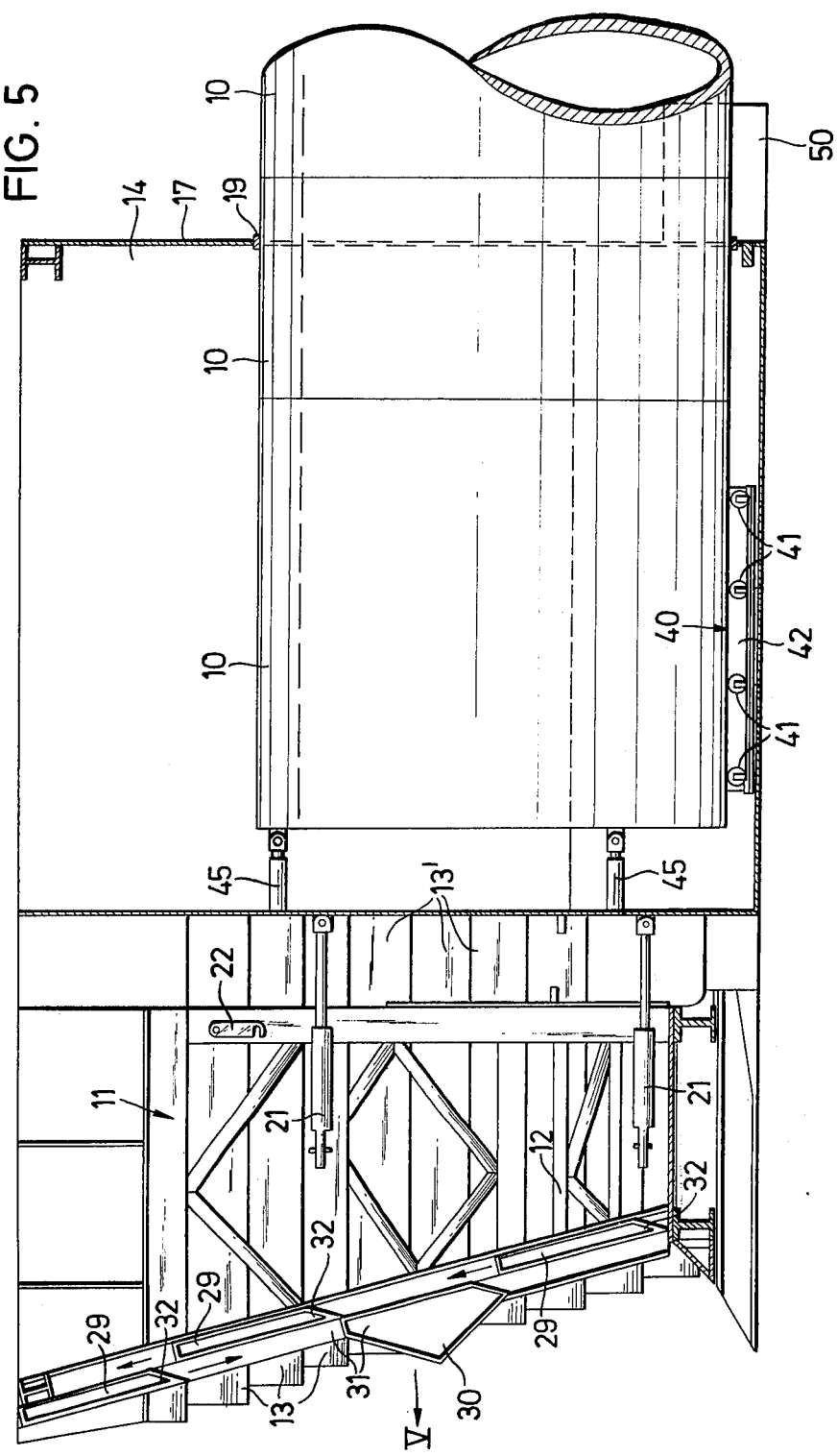

APPARATUS FOR AND A METHOD OF LAYING A PIPE LINE

BACKGROUND TO THE INVENTION

The present invention relates to apparatus for, and a method of, laying a pipe line composed of pipe sections arranged end-to-end.

In the construction of pipe lines it is known to excavate an open trench and to arrange pipe-sections end-to-end in the trench. One way of excavating the trench is to utilize an advanceable drive shield composed of elongate cutter planks displaceably supported by a frame or frames. The planks define and support the trench walls and are driven forwards individually or in groups to penetrate a working face at the front end of the trench.

The pipe sections can be lowered into the trench behind the shield and connected up end-to-end before the trench is refilled. In water logged ground the pipe laying operation becomes difficult and to overcome this difficulty it has been proposed to use a sealed receptacle into which the pipe sections can be lowered. This receptacle has an opening through which the previously-installed pipe section extends and the receptacle can be shifted up from time to time as the work progresses. Despite the general success of this form of apparatus there are still problems in certain areas, notably the shifting of the shield and the receptacle and general adjustment and control especially where the pipe sections are relatively large and heavy and/or where the soil is especially water laden.

A general object of the present invention is to provide an improved apparatus and method for the construction of the pipe lines.

SUMMARY OF THE INVENTION

In one aspect the invention provides an apparatus for use in laying a pipe line composed of pipe sections arranged end-to-end; said apparatus comprising an advanceable shield for excavating a trench and for supporting the walls thereof and a receptacle located rearwardly of the shield relative to the direction of advancement and serving to receive individual pipe sections, the receptacle being connected to or connectible with the shield and having an opening allowing the receptacle to be moved up with the shield along the pipe line wherein the shield and the receptacle are provided with selectively operable clamping means engageable with the walls of the trench.

In another aspect of the invention provides a method of laying a pipe line composed of pipe sections arranged end-to-end; said method comprising excavating an open trench with an advanceable shield, introducing a pipe section into a receptacle located in the trench rearwardly of the shield, arranging the pipe section in end-to-end relationship with a previously installed pipe section projecting through an opening in the receptacle, moving the receptacle to follow up the advancement of the shield and utilizing clamping means of the shield and the receptacle to selectively clamp the shield and the receptacle to the trench walls.

The movement of the shield and the receptacle would normally be accomplished by hydraulic rams as is known per se.

In the case of heavy pipe sections, and where the soil is largely unconsolidated and water laden so it tends to flow, the forces opposing the movement of the shield and the receptacle can largely negate the normal self-anchoring function of the shield. However, by operating the clamping means at selected times the shield and receptacle can be reliably anchored to provide an adequate reactive abutment for the shifting forces. Where the shield employs the known form of elongate cutter planks displaceably supported on frame means it is sufficient to provide gripping devices on some of the planks to act as the clamping means for the shield. Similar devices can be provided on the side walls of the receptacle to act as the clamping means therefor. The gripping devices are preferably expandable and contractable laterally of the trench and can be operated manually, or mechanically or by hydraulic means. In the case of the receptacle the gripping devices are preferably retractable into recesses in the side walls when not in use. At a selected stage during the pipe laying operation the gripping devices can all be operated to firmly clamp the planks in question and the receptacle. These components together with the remaining planks in frictional contact with the trench walls can collectively act as an abutment for the frame means of the shield so this can be advanced. Similarly, when the gripping devices of the planks are operated and the gripping devices of the receptacle are rendered inoperative the entire shield can act as an abutment for shifting up the receptacle which moves along the pipe line.

The receptacle and the frame means of the shield are preferably interconnected by means permitting these components to be shifted together or independently where the conditions are difficult. Where the frame means and the receptacle are to move together, mechanical coupling devices, preferably easily releasable, can provide the necessary connection and preferably allow a certain degree of articulated mobility between the components. In this case the gripping devices of the planks may be operated if desired. Hydraulic piston and cyinder units can then also connect the frame means and the receptacle and by releasing the coupling device the frame means can be shifted up whilst the receptacle is clamped and then the receptacle can be released and drawn up to the frame means by operating the hydraulic units.

In accordance with a further feature of the invention the shield, or more preferably the frame means thereof, can have an adjustable bulkhead at its front end which can be adjusted to screen off selected areas of the working face of the trench. Where the face is relatively stable this bulkhead can be removed to open up the shield as is normal. Where, however, the face is relatively flowable the bulkhead can be adjusted to permit a certain part of the face to flow in the manner of an extrusion through the bulkhead into the shield as the frame means is advanced. This is especially useful where the depth of the trench is relatively great. The bulkhead adjustable in this way can be constructed in a variety of ways but one form, described in more detail hereinafter, utilizes plates with cutting edges which are raised or lowered to partly overlap one another thereby creating adjustable-width gaps between the plates. The displacement of the plates can be accomplished with the aid of hydraulic units or mechanical screws for example and after the frame means has been advanced the plates can be readjusted to screen-off the working face and the material allowed in the shield can be removed such as by pumping or dredging.

It is desirable to provide some means for altering the position of the pipe section installed in the receptacle. To this end an apparatus made in accordance with the invention may employ an adjustable support means in the receptacle onto which the pipe section can be lowered. The support means preferably comprises a roller bed or assembly with rollers engageable with an exterior part of the pipe section. This will also assist in guiding the receptacle as it is drawn up along the pipe line. It is desirable to be able to adjust the support means in a vertical sense as well as to be able to tilt the support means front to rear and from side to side.

Hydraulic units can be provided for this purpose. The adjustability of the support means not only facilitates alignment of the pipe section with the previously installed pipe section it also enables direction of the pipe line to be controlled to some extent in horizontal and vertical senses. It is desirable to locate an external support on the floor of the trench to align with the support means in the receptacle.

As will become apparent hereinafter apparatus made in accordance with the invention may comprise an advanceable shield for excavating a trench and for supporting the walls thereof, a receptacle located rearwardly of the shield relative to the direction of advancement and serving to receive individual pipe sections, an opening in the receptacle permitting communication between the interior and the exterior thereof whereby the pipe sections can be arranged end-to-end and the receptacle can be moved up in the direction of advancement as the pipe line is extended, means connecting the shield and the receptacle together and clamping means on the shield and the receptacle for selectively engaging the trench walls to anchor the respective components.

Apparatus made in accordance with the invention may also comprise an advanceable shield usable to excavate a trench and to support the walls thereof, the shield having a plurality of elongate members and a frame supporting the members for longitudinal displacement, adjustable bulkhead at the front end of the frame which can be adjusted to open a selected portion of the working face to the interior of the shield, and a receptacle for receiving individual pipe sections, the receptacle being disposed behind the shield and having an opening permitting communication between the interior and exterior thereof whereby the pipe sections can be arranged end-to-end and the receptacle can be moved up in the direction of advancement as the pipe line is extended.

Apparatus made in accordance with the invention may also comprise an advanceable shield for excavating a trench and for supporting the walls thereof, a receptacle located rearwardly of the shield relative to the direction of advancement and serving to receive individual pipe sections, an opening in the receptacle permitting communication between the interior and exterior thereof whereby the pipe sections can be arranged end-to-end and the receptacle can be moved up in the direction of advancement as the pipe line is extended and adjustable support means in the receptacle for supporting a pipe section introduced into the receptacle.

The invention may be understood more readily, and various other features of the invention may become apparent, from consideration of the following description.

BRIEF DESCRIPTION OF DRAWINGS

An embodiment of the invention will now be described, by way of example only, with reference to the accompanying drawings, wherein:

FIG. 1 is a schematic sectional side view of apparatus made in accordance with the invention;

FIG. 2 is a cross-sectional view of part of the apparatus taken along the line II—II of FIG. 1;

FIG. 3 is a cross-sectional view of part of the apparatus taken along the line III—III of FIG. 1;

FIG. 4 is an end view of part of the apparatus taken in the direction of the arrow IV of FIG. 1; and FIG. 5 is a view of the apparatus generally corresponding to FIG. 1 but showing the apparatus in a different operating condition.

DESCRIPTION OF PREFERRED EMBODIMENT

In general a composite pipe line for water mains, sewerage, or other purposes is composed of individual pipe sections 10 arranged end-to-end and installed with the aid of the apparatus depicted in the drawings. The individual pipe sections 10, which are preferably prefabricated from concrete, are laid in an open trench. The pipe sections 10 may be provided with location means, such as stepped tongue and groove connections on facing ends to locate each section 10 against the previously installed section 10. As the pipe line advances the installed sections 10 are covered by soil or a similar filling to reconstitute the ground surface so that the pipe sections 10 are buried beneath the ground surface. Conveniently, the material removed to form the trench can be used as the in-filling. This means that only a sufficient length of open trench for working need be provided. As shown in the drawings, to excavate the trench in advance of the actual pipe line the apparatus uses a drive shield 11 which defines the shape of the trench and also serves to support the side walls of the trench. This shield 11 is composed of a plurality of parallel elongate plank members 13 generally arranged about the axis of the trench. The plank members 13 engage on the sides and the bottom or floor of the trench. In known manner, the forward ends of these members 13 have cutting edges and are urged forward individually or in groups in the direction of arrow V in FIG. 1 to penetrate a working end face of the trench. Each member 13 is supported for displacement in its longitudinal direction and to shift the members 13 there can be provided double-acting hydraulic rams (not shown) which are supported by a main frame 12. This frame 12 serves to support the members 13 and to guide the members 13 during their longitudinal displacement. The shifting rams can each be connected via a linkage or bracket to a respective associated member 13 or group of members 13. It is possible to provide a ram for each member 13 or alternatively each ram or some of the rams may each serve to displace a group of several members 13. In this latter case some appropriate connecting means can be provided to connect the members 13 of the group together.

In known manner the plank members 13 are driven forwards in the direction of arrow V in FIG. 1 either individually or in groups by extending the associated ram or rams. When all the members 13 have been advanced the frame 12 can be drawn up as described hereinafter.

The frame 12 is a rigid structure of generally U-shaped cross-section open at the top. The frame 12 is composed of two upstanding components 12a, 12b, (FIG. 1) interconnected by means of bracing arms 12c.

The foremost frame component 12b is inclined as shown in FIGS. 1 and 5. Rearwardly of the shield 11 relative to the working face of the trench there is provided a pipe receptacle 14 which serves to receive the individual pipe sections 10. The members 13 have rearwardly projecting end portions 13' which partly extend over the receptacle 14, preferably at all times. The receptacle 14 itself takes the form of a box-like sheet metal unit with a U-shaped cross-section open at the top to receive the pipe sections. The receptacle 14 preferably projects above ground level. As shown in FIGS. 2 and 3, the side walls of the receptacle 14 are of composite form and partly hollow with chambers 16 capable of being filled with water or some other fluid. The purpose of this is to permit control of the alignment of the receptacle 14 and to stabilize the latter. By admitting water or other fluid into certain of the chambers 16 and by removing water from others the receptacle 14 can be made to tilt about the driving direction V or about a transverse centre line. The side walls 15 of the receptacle 14 adjoin a floor portion which rests on the floor of the trench. The receptacle also has end walls 17, 20 and its interior is thus closed off from the exterior, i.e., the trench, and is made water tight. The end wall 20 is connected to the frame 12 so that the receptacle 14 as a whole is movable with the frame 12 when desired. In this construction hydraulic double-acting piston and cylinder units 21 and mechanical coupling devices 22 are provided for connecting the receptacle 14 and the frame 12. The units 21 are pivotably connected to the frame 12 and to the wall 20. The devices 22 are in the form of pivotable levers on the frame component 12a which can be hooked or locked onto pins 23 carried by the wall 20 or released therefrom.

The end wall 17 of the receptacle 14 is provided with a circular opening 18 which enables one of pipe sections 10 at the end of the pipe line to extend from the exterior into the receptacle 14. A seal or packing 19, which is preferably resilient, is mounted at the defining edge of the opening 18 and engages on the exterior of the pipe section 10 so as to seal the interior of the receptacle 14 relative to the exterior.

Both the shield 11 and the receptacle 14 are provided with clamping means capable of selectively anchoring part of the shield 11 and the receptacle 14 against the trench walls. In the case of the shield 11 at least some of the plank members 13 are provided with gripping devices 24 which can be expanded outwardly in the lateral sense to the driving direction V to engage firmly with the trench walls or contracted inwardly to permit movement of the plank members 13 in question. Claws or plates may be used in the devices 24 to actually contact the walls of the trench. The devices 24 can be operated mechanically or hydraulically, for example, by piston and cylinder units. In a similar manner, the receptacle 14 is also provided with gripping devices 25. These devices 25 are located at the bottom zone of the exterior part of the side walls 15 and the devices 25 are operated hydraulically with the aid of piston and cylinder units 26 to expand and grip the trench walls or else to contract and allow the displacement of the receptacle 14. The devices 25 are pivotably supported on hinge pins 27 mounted to the walls 15 and the devices 25 can be moved outwardly to project beyond the exterior of the associated side wall 15, as shown in FIG. 2, or retracted into a pocket-like recess 28 formed at the bottom of the side walls 15 as shown in FIG. 3.

When the frame 12 is to be advanced the gripping devices 24 of the shield 11 and the gripping devices 25 of the receptacle 14 are operated to firmly anchor the plank members 13 and the receptacle 14 against the trench walls.

The coupling devices 22 would then be released as shown in FIG. 5, and the rams of the shield 11 and the units 21 can now be operated together to move the frame 12 forwards. Thereafter when it is desired to move the receptacle 14 up the devices 25 would be retracted and the units 21 operated in the reverse sense. The receptacle 14 this moves along the pipe section 10 partly external thereof and the seal 19 relocates on the pipe section 10 formerly introduced into the receptacle 14. This pipe section 10 then projects between the exterior and interior of the receptacle 14 — as shown at the right hand side of FIG. 1 and forms the end of the pipe line. A fresh pipe section 10 can thereafter be lowered into the receptacle 14 and arranged end-to-end with the other pipe section 10 — as shown at the left hand side of FIG. 1. When the plank members 13 are to be advanced again the coupling devices 22 would be reconnected and the devices 25 would be extended to firmly anchor the receptacle 14. The sequence would then be repeated.

Where conditions permit, the receptacle 14 can be coupled with the frame 12 with the aid of the devices 22 when the frame 12 is shifted so that the frame 12 and the receptacle 14 move together as a composite unit in relation to the members 13. The gripping devices 25 would of course in this case be retracted while the devices 24 are operative so that the members 13 provide an abutment anchorage for the shifting forces. The units 21 would not operate in this alternative sequence. The easy releasibility of the devices 22 enables the receptacle 14 to be shifted independently of the frame 12 as described above should the working conditions deteriorate.

Support means is provided in the receptacle 14 to facilitate alignment between the pipe sections 10 and to control the direction of the resultant pipe line. This means takes the form of a roller assembly 40 located on the floor of the receptacle 14 as shown in FIGS. 2 and 5. The assembly 40 employs sets of rollers 41 arranged in arcuate configuration to match the curvature of the pipe section 10 and to engage on the lower peripheral surface of the pipe section 10 installed in the receptacle 14. The rollers 41 are rotatably supported by a trough-like carriage 42 superimposed on a base plate 43. As shown in FIG. 2, hydraulic piston and cylinder units 44 are located between the base plate 43 and the carriage 42. The units 44 permit the carriage 42 and hence the pipe section 10 lowered thereon to be adjusted. The carriage 42 is also pivoted at about the centre of the base plate 43, preferably by some form of universal joint, permitting the carriage 42 to assume inclined positions. This allows parts of the pipe line to be laid along non-rectilinear paths, e.g., to extend over a curved horizontal path or to rise or fall over certain regions. The assembly 40 also assists in guiding the receptacle 14 when the latter is displaced in the advancing direction. To facilitate connection between the pipe sections 10, hydraulic piston and cylinder units 45 are located inside the receptacle 14 and mounted to the wall 20. These units 45 can provide a thrust force to the end of a pipe section 10 installed therein.

To provide exterior support for the pipe sections 10 narrow webs or rails 50 made from concrete for example can be installed in the trench behind the receptacle 14 as shown in FIGS. 1 and 2. These webs 50 extend parallel to one another and are substantially aligned with the roller assembly 40 so as to prevent the pipe sections 10 from tilting downwards at the advancement of the receptacle 14. Even where the trench bottom is inclined the adjustability of the rollers assembly 40 permits the support provided by the rollers 41 to be aligned with the upper contact surfaces of the webs 50. It is possible to introduce fluid concrete between the webs 50 to provide support for the pipe sections 10 over a somewhat larger zone if desired.

The shield 11 is provided with an adjustable bulkhead which is preferably at least partly removable and which is particularly useful in heavy water-logged soil and in flowable materials. As shown, this bulkhead is of multi-part construction with individual bulkhead plates 29 arranged in the general sense one above another on the front inclined frame component 12b of the shield 11. The plates 29 cover over all or a part of the working face at the front end of the trench without obstructing the plank members 13. The plates 29 have lateral end portions slidably supported in staggered or offset guideways 31 in the frame component 12b permitting the plates 29 to be raised and lowered individually. Preferably mechanical screws or spindles or hydraulic means, such as the unit 51 in FIG. 4, is provided to effect such adjustment of the plates 29. A further bulkhead partition 30 is located at the central region of the frame component 12b and this partition 30 is fixed to the frame component 12b. The plates 29 can be made to overlap in a variety of positions and have cutting blades 32 at their lower edges. Hence, the plates 29 can be moved in the directions of arrows P in FIG. 1 so that for example the lowest plate 29 can be raised behind the partition 30 and the next uppermost plate 29 can be lowered behind the partition 30. By adjusting the relationship between the plates 29 in the manner of a sluice gate it is thus possible to open up or expose a certain zone of the working face to the interior of the shield 11 so that as the frame 12 is advanced material can flow from the working face and into the shield 11 via the bulkhead 29, 30. When the frame 12 has been advanced the plates 29 can be readjusted to close off the working face if the material is partly fluid. The material which accumulates inside the shield 11 can be removed by any suitable process and where the material is sufficiently fluid dredging or pumping techniques can be used. Where the use of a bulkhead is unnecessary, as in the case of compact soil, the plates 29 can be withdrawn from the guideways 31 to open up the front of the shield 11 in the normal way.

I claim:

1. An apparatus for use in laying a pipe line composed of pipe sections arranged end-to-end; said apparatus comprising an advanceable shield usable to excavate a trench and to support the walls thereof, the shield having a plurality of elongate members and a frame supporting the members for lonitudinal displacement, an adjustable bulkhead at the front end of the frame which can be adjusted to open a selected portion of the working face to the interior of the shield, and a receptacle for receiving individual pipe sections, the receptacle being disposed behind the shield and having an opening permitting communication between the interior and exterior thereof whereby the pipe sections can be arranged end-to-end and the receptacle can be moved up in the direction of advancement as the pipe line is extended.

2. An apparatus according to claim 1, wherein at least some of the elongate members are provided with expandable gripping devices for engaging the trench walls and thereby clamp the shield.

3. An apparatus according to claim 2, wherein the frame and the receptacle are interconnected by means of hydraulic piston and cylinder units and there is also provided releasable coupling device for interconnecting the frame and the receptacle at a certain stage in the pipe laying operation.

4. An apparatus according to claim 2, wherein the receptacle has side walls provided with gripping devices which are movable inwardly or outwardly relative to the side walls, the gripping devices constituting the clamping means for the receptacle.

5. Apparatus according to claim 1, wherein the bulkhead is of multi-part construction with plates at least some of which are adjustable in position.

6. Apparatus according to claim 1, wherein the bulkhead has plates guided for movement in guideways of the frame means so that the plates can be raised or lowered to partially overlap.

7. Apparatus according to claim 6, wherein the bulkhead plates are formed with cutting edges at their lower edges.

8. Apparatus according to claim 2, and further comprising adjustable support means in the receptacle for supporting a pipe section lowered into the receptacle for connection with the pipe line.

9. Apparatus according to claim 2, wherein the receptacle has side walls which are at least partly hollow and contain chambers into which a ballast fluid can be introduced.

10. An apparatus for use in laying a pipe line composed of pipe sections arranged end-to-end; said apparatus comprising an advanceable shield for excavating a trench and for supporting the walls thereof, the shield comprising a plurality of longitudinally displaceable elongate members and frame means supporting the elongate members, a receptacle located rearwardly of the shield relative to the direction of advancement and serving to receive individual pipe sections, a opening in the receptacle permitting communication between the interior and the exterior thereof whereby the pipe sections can be arranged end-to-end and the receptacle can be moved up in the direction of advancement as the pipe line is extended, hydraulic piston and cylinder units connecting the shield and the receptacle together, releasable coupling device for interconnecting the frame means and the receptacle at a certain stage during the pipe laying operation, and clamping means on the shield and the receptacle for selectively engaging the trench walls to anchor the respective components, wherein at least some of the elongate members of the shield are provided with expandable gripping device constituting the clamping means for the shield.

11. An apparatus for use in laying a pipe line composed of pipe sections arranged end-to-end; said apparatus comprising an advanceable shield for excavating a trench and for supporting the walls thereof, a multi-part bulkhead at the front end of the shield which can open a selected part of the working face at the front end of the trench to the interior of the shield, a receptacle located rearwardly of the shield relative to the direction of advancement and serving to receive individual pipe sections, an opening in the receptacle permitting communication between the interior and the exterior thereof whereby the pipe sections can be arranged end-to-end and the receptacle can be moved up in the direction of advancement as the pipe line is extended, means connecting the shield and the receptacle together and clamping means on the shield and the receptacle for selectively engaging the trench walls to anchor the respective components.

12. An apparatus for use in laying a pipe line composed of pipe sections arranged end-to-end; said apparatus comprising an advanceable shield for excavating a trench and for supporting the walls thereof, a multi-part bulkhead at the front end of the shield which can open a selected part of the working face at the front end of the trench to the interior of the shield, a receptacle located rearwardly of the shield relative to the direction of advancement and serving to receive individual pipe sections, an opening in the receptacle permitting communication between the interior and exterior thereof whereby the pipe sections can be arranged end-to-end and the receptacle can be moved up in the direction of advancement as the pipe line is extended, and adjustable support means in the receptacle for supporting a pipe section introduced into the receptacle.

13. An apparatus according to claim 11, wherein the shield is composed of a plurality of longitudinally displaceable elongate members supported by frame means and at least some of the elongate members are provided with expandable gripping devices constituting the clamping means for the shield.

14. A method of laying a pipe line composed of pipe sections arranged end-to-end comprising, excavating an open trench with an advanceable shield having a bulkhead and frame, introducing a pipe section into a receptacle located in the trench rearwardly of the shield, arranging the pipe section in end-to-end relationship with a previously installed pipe section projecting through the opening in the receptacle, moving the receptacle to follow up the advancement of the shield, utilizing clamping means of the shield and the receptacle to selectively clamp the shield and the receptacle to the trench walls and adjusting the bulkhead at the front end of the shield adjacent the working face at the front end of the trench to permit a selected part of the face to be forced into the shield when the frame is advanced.

15. A method of laying a pipe line composed of pipe sections arranged end-to-end comprising, excavating an open trench with an advanceable shield, introducing a pipe section into a receptacle located in the trench rearwardly of the shield, aligning the pipe section in an end-to-end connecting relationship with a previously installed pipe section projecting through the opening in the receptacle by adjustment of support means in the receptacle, moving the receptacle to follow up the advancement of the shield and adjusting a bulkhead at the front end of the shield adjacent the working face at the front end of the trench to permit a selected part of the face to be forced into the shield when the shield is advanced.

16. A method of laying a pipe line composed of pipe sections arranged end-to-end; said method comprising excavating an open trench with an advanceable shield having a bulkhead and frame, introducing a pipe section into a receptacle located in the trench rearwardly of the shield, arranging the pipe section in end-to-end relationship with a previously installed pipe section projecting through an opening in the receptacle, moving the receptacle to follow up the advancement of the shield and adjusting the bulkhead at the front end of the shield adjacent the working face at the front end of the trench to permit a selected part of the bulkhead to be forced into the face when the frame is advanced.

17. A method according to claim 16, and further comprising introducing support means in the trench externally and rearwardly of the receptacle to support the pipe sections in the trench.

18. Apparatus according to claim 1, wherein the support means comprises a roller assembly raisable or lowerable in relation to the receptacle.

19. Apparatus according to claim 18, wherein the roller assembly is mounted for tilting in the direction of advancement and transversally thereto.

* * * * *